United States Patent
Kang et al.

(10) Patent No.: US 8,441,588 B2
(45) Date of Patent: May 14, 2013

(54) DISPLAY APPARATUS INCLUDING TRANSFORMERS

(75) Inventors: Hyung-Ku Kang, Seoul (KR); Woo-Young Lee, Daegu (KR); Jong-Jae Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 184 days.

(21) Appl. No.: 13/006,778

(22) Filed: Jan. 14, 2011

(65) Prior Publication Data

US 2011/0228186 A1    Sep. 22, 2011

(30) Foreign Application Priority Data

Mar. 16, 2010    (KR) ........................ 10-2010-0023374

(51) Int. Cl.
*G02F 1/1333*    (2006.01)

(52) U.S. Cl.
USPC .................... 349/33; 349/56; 349/58; 349/59

(58) Field of Classification Search ..... 174/396, 336/59, 336/61, 65, 68, 84 C, 98, 208; 323/355; 349/33; 362/97.1
See application file for complete search history.

(56) References Cited

U.S. PATENT DOCUMENTS

| | | | | | |
|---|---|---|---|---|---|
| 1,651,922 | A | * | 12/1927 | Hughes | 174/396 |
| 2,320,902 | A | * | 6/1943 | Williams | 336/59 |
| 5,510,948 | A | * | 4/1996 | Tremaine et al. | 361/90 |
| 2001/0050735 | A1 | * | 12/2001 | Yajima et al. | 349/65 |
| 2003/0156002 | A1 | * | 8/2003 | Caramela et al. | 336/200 |
| 2007/0296903 | A1 | * | 12/2007 | Lee et al. | 349/143 |
| 2007/0298662 | A1 | * | 12/2007 | Kim | 439/620.02 |
| 2008/0297998 | A1 | * | 12/2008 | Choi | 361/681 |
| 2010/0172098 | A1 | * | 7/2010 | Isoshima et al. | 361/697 |

* cited by examiner

*Primary Examiner* — Bumsuk Won
*Assistant Examiner* — Ryan Crockett
(74) *Attorney, Agent, or Firm* — Cantor Colburn LLP

(57) ABSTRACT

A display apparatus includes a display panel, a transformer disposed under the display panel and including a primary winding and a secondary winding which are separated from each other and an insulating section between the primary winding and the secondary winding, and a lower housing member on which the display panel is placed and to which the transformer is fixed. A first region corresponding to the insulating section of the transformer is defined in the lower housing member, and at least one hole is disposed in the first region of the lower housing member.

17 Claims, 8 Drawing Sheets

DISPLAY APPARATUS INCLUDING TRANSFORMERS

This application claims priority to Korean Patent Application No. 10-2010-0023374 filed on Mar. 16, 2010, and all the benefits accruing therefrom under 35 U.S.C. §119, the disclosure of which is incorporated herein by reference in its entirety.

BACKGROUND OF THE INVENTION

1. Field of the Invention

The invention relates to a display apparatus including transformers.

2. Description of the Related Art

One of the major trends in the development of display apparatuses is to produce slimmer display apparatuses. Accordingly, liquid crystal display ("LCD") devices have a large share of sales in the display market since they are lighter, slimmer and more compact than other display apparatuses.

An LCD panel included in an LCD is not self-luminous, and thus the LCD requires a light unit that can supply light to the LCD panel. In addition, the LCD may include transformers for driving the light unit. The transformers may be mounted on a circuit board, such as a printed circuit board ("PCB"), and may be disposed behind the LCD. The LCD may further include a lower housing member which protects the LCD panel, the light unit, and the like and improves the assembling efficiency of the LCD.

The circuit board on which the transformers are mounted may be attached to the lower housing member. The lower housing member may include a conductive material such as iron, aluminum, or the like. Here, an eddy current may be generated in the lower housing member by the leakage fluxes of the transformers mounted on the circuit board which is attached to the lower housing member. The eddy current may degrade the quality of LCD devices, that is, may generate heat, increase power consumption, and cause noise.

BRIEF SUMMARY OF THE INVENTION

The invention provides a display apparatus which can minimize an eddy current generated in a lower housing member by leakage fluxes of transformers.

In an exemplary embodiment of the invention, a display apparatus includes a display panel, a transformer disposed under the display panel and including a primary winding and a secondary winding which are separated from each other, and an insulating section between the primary winding and the secondary winding, and a lower housing member on which the display panel is placed and to which the transformer is fixed. A first region corresponding to the insulating section of the transformer is defined in the lower housing member, and at least one hole is disposed in the first region of the lower housing member.

The hole may be polygonal or may be shaped like a curved surface having a predetermined curvature, in a plan view. In addition, the display panel may be a liquid crystal display ("LCD") panel.

A second region corresponding to an entire planar region of the transformer may be defined in the lower housing member, and the hole may be larger than the first region and is smaller than the second region. In addition, a third region and a fourth region corresponding respectively to the primary winding and the secondary winding of the transformer may be defined in the lower housing member, and the hole may be disposed overlapping a portion of the third region and a portion of the fourth region. In addition, a heat dissipation pad may be attached to a portion of the second region of the lower housing member.

The display apparatus may further include one or more light sources, and the transformer may provide power to the light sources. The light sources are cold cathode fluorescent lamps ("CCFLs"). In particular, a distance between the CCFLs and the lower housing member may be about 20 millimeters (mm) or less in a direction perpendicular to the lower housing member. That is, the CCFLs may be disposed very close to the lower housing member, thereby making the display apparatus slim.

The lower housing member may include a conductive material. An electrical potential of the lower housing member may be a reference ground voltage of the display apparatus.

In another exemplary embodiment, a display apparatus includes a display panel, an upper housing member and a lower housing member receiving the display panel, the lower housing member including a bottom planar member and sidewalls extending from the bottom planar member; and a transformer on a rear surface of the bottom planar member of the lower housing member. The transformer includes a primary winding and a secondary winding which are separated from each other; and an insulating section between the primary winding and the secondary winding. An open member is extended through the bottom planar member of the lower housing member, and the open member overlaps the insulating section of the transformer.

BRIEF DESCRIPTION OF THE DRAWINGS

The above and other features of the invention will become more apparent by describing in detail exemplary embodiments thereof with reference to the attached drawings, in which.

DETAILED DESCRIPTION OF THE INVENTION

Figure 1:
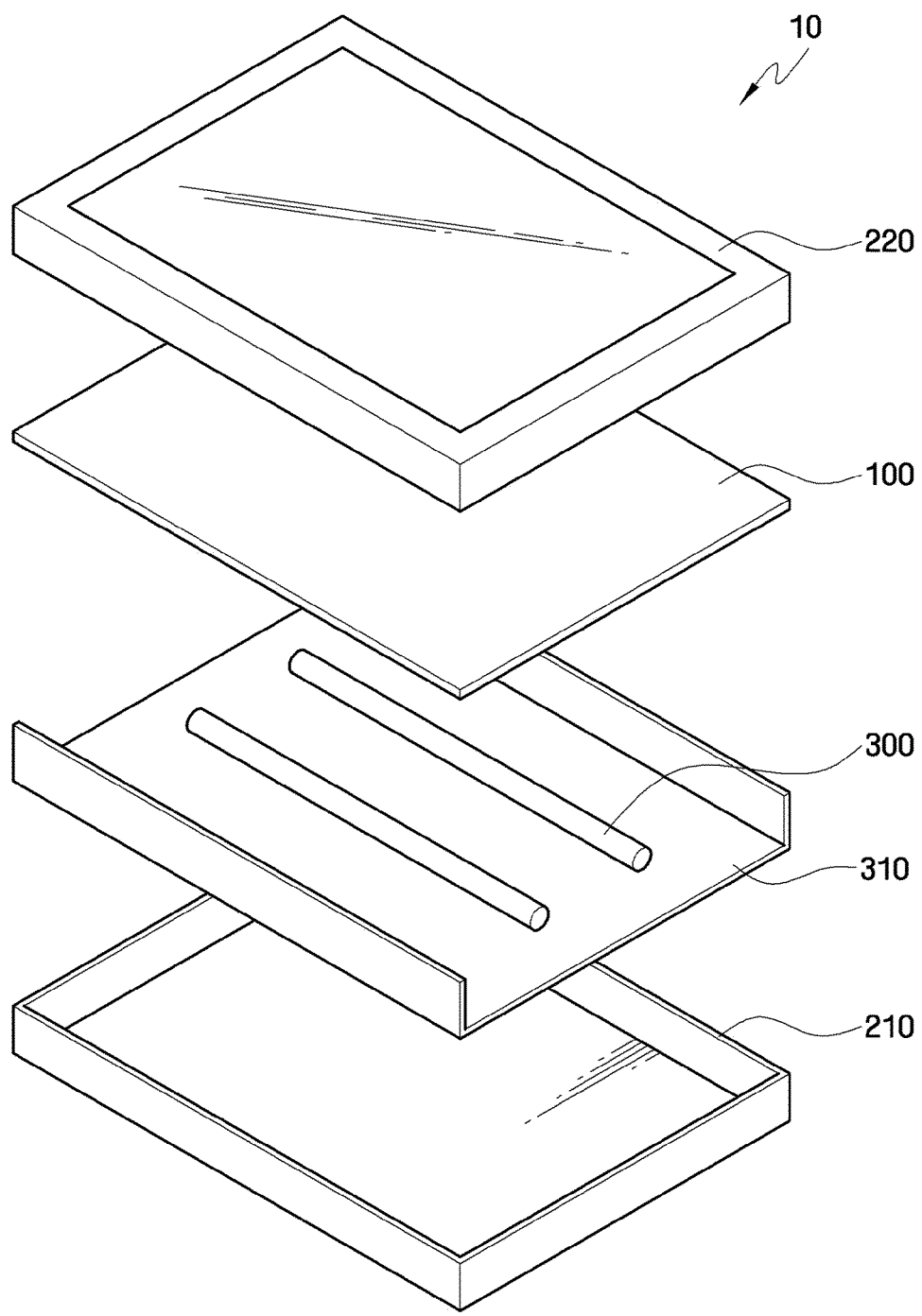
FIG. 1 is an exploded perspective view of an exemplary embodiment of a display apparatus, according to the invention.

Advantages and features of the invention and methods of accomplishing the same may be understood more readily by reference to the following detailed description of exemplary embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. In some embodiments, well-known processes, structures, and technologies will not be specifically described in order to avoid ambiguous interpretation of the invention. Like reference numerals refer to like elements throughout the specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms.

These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper," and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

FIG. 1 is an exploded perspective view of an exemplary embodiment of a display apparatus 10, according to the invention.

Referring to FIG. 1, the display apparatus 10 includes a display panel 100, a lower housing member 210, an upper housing member 220, and a plurality of a light source 300.

The lower housing member 210 is located behind (e.g., towards a rear of) the display panel 100, and the display panel 100 is placed on a viewing side of the lower housing member 210. The lower housing member 210 may include a conductive material such as stainless steel, aluminum, or conductive plastic. Here, an electrical potential of the lower housing member 210 may be equal to that of a reference ground voltage of the display apparatus 10.

The lower housing 210 includes a planar bottom portion, and sidewalls extending from edges of the planar bottom portion toward the upper housing 220, that is, towards a viewing side of the display apparatus 10.

The upper housing member 220 is located in front (e.g., at the viewing side) of the display panel 100, and fixes the display panel 100 in place while protecting the display panel 100.

The display apparatus 10 may be a liquid crystal display ("LCD"), and the display panel 100 may be an LCD panel.

The light sources 300 provide light to the display panel 100. If the display panel 100 is an LCD panel, the light sources 300 are required since an LCD panel cannot generate light by itself. The light source 300 may be light-emitting devices such as cold cathode fluorescent lamps ("CCFLs") or light-emitting diodes ("LEDs"). A reflective or base member 310 may be disposed between the light sources 300 and the lower housing member 210

Although not shown in the drawing, the display apparatus 10 may further include a light guide and/or a diffusion sheet to uniformly deliver light emitted from the light sources 300 to an entire surface of the display panel 100.

Also, although not shown in the drawing, the display apparatus 10 may further include a display panel controller which controls a data voltage applied to the display panel 100, and/or a light source controller which controls the light sources 300. These controllers may be disposed directly on the display panel 100, or may be disposed directly on a circuit board such as a printed circuit board (PCB) and then the circuit board is attached to the lower housing member 210. The controllers may include transformers 420 (see FIG. 2) which are general-use circuit devices. Each of the transformers 420 may be mounted on a circuit board 410 (see FIG. 2) such as a PCB, and then placed adjacent to the lower housing member 210.

To make the display apparatus 10 slim, the light sources 300 (e.g., CCFLs) must be placed very close to the lower housing member 210 with minimal distance between the light sources 300 and the lower housing member 210. In one exemplary embodiment, for example, the distance between the CCFLs and the lower housing member 210 may be about 20 millimeters (mm) or less, and the distance is taken perpendicular to a plane of the lower housing member 210.

In addition, to make the display apparatus 10 slim, the circuit board 410 including the transformers 420 mounted thereon, must be placed very close to the lower housing member 210 with minimal distance between the circuit board 410 and the lower housing member 210. However, if the transformers 420 are placed very close to the lower housing member 210, an eddy current may be generated in the lower housing member 210, by the leakage fluxes of the transformers 420. To minimize the leakage fluxes of the transformers 420, one or more holes are disposed in a region of the lower housing member 210 which correspond to each of the transformers 420 (specifically, a region of the lower housing member 210 which corresponds to an insulating section of each of the transformers 420) in the embodiments of the invention. This will now be described in detail with reference to FIGS. 2 through 10.

Figure 2:
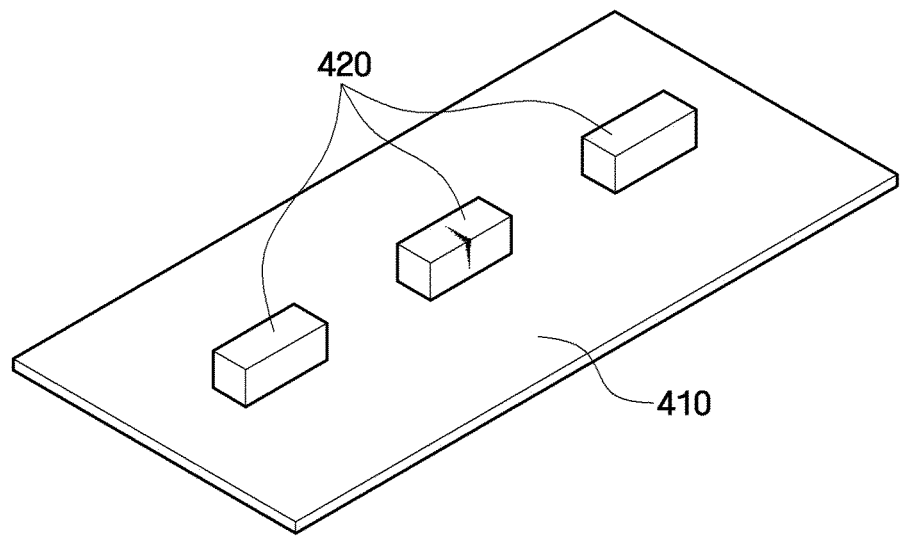
FIG. 2 is a perspective view of an exemplary embodiment of a circuit board on which transformers are mounted.

FIG. 2 is a perspective view of the circuit board 410 on which the transformer 420 is mounted. The transformers 420 and the circuit board 410 shown in FIG. 2 may be included in the display panel controller and/or the light source controller.

Figure 3:
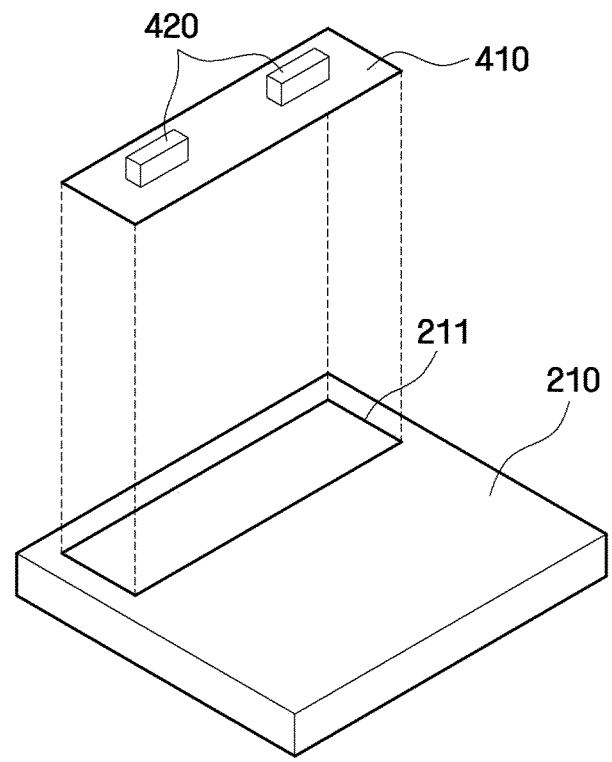
FIGS. 3 and 4 are diagrams for explaining exemplary embodiments of a relationship between a circuit board including transformers mounted thereon, and a lower housing member.
Figure 4:
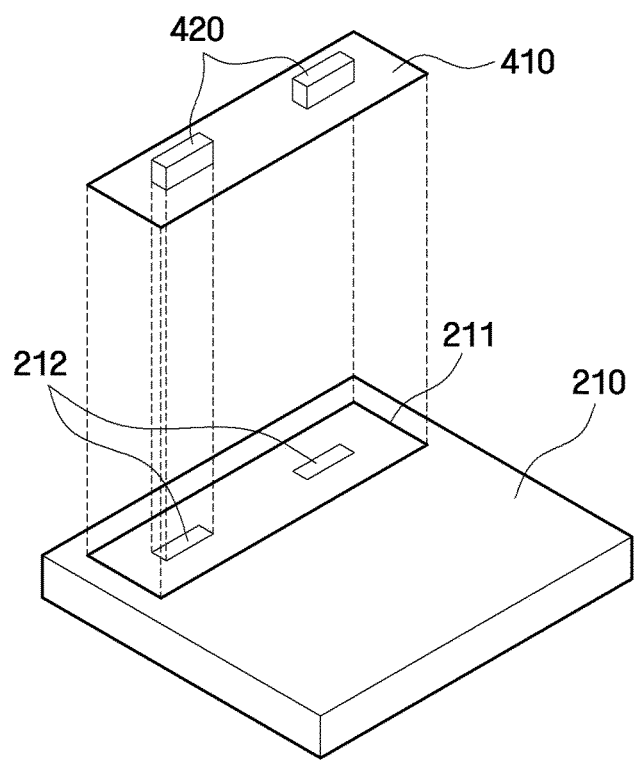

FIGS. 3 and 4 are diagrams for explaining exemplary embodiments of a relationship between the circuit board 410 including the transformers 420 mounted thereon, and the lower housing member 210.

Referring to FIGS. 3 and 4, the circuit board 410 on which the transformers 420 are mounted is attached as close to the lower housing member 210 as possible in order to make the display apparatus 10 slim. That is, the circuit board 410 is disposed directly on the planar bottom portion of the lower housing member 210. The transformers 420 are on a first surface of the circuit board 410, and a second surface of the circuit board 410 opposing the first surface, faces a rear of the lower housing member 210. That is, the transformers 420 extend away from the lower housing member 210, and the circuit board 410 is disposed between the transformers 420 and the planar bottom portion of the lower housing member 210.

The circuit board 410 may be attached to the lower housing member 210 such that the circuit board 410 fits to a first region 211 of the lower housing member 210 which corresponds to an entire region of the circuit board 410. That is, a planar area of the first region 211 is substantially a same dimension as a planar area of the circuit board 410. As used herein, "corresponding" indicates being the same or aligned in quantity, shape, size or positional placement relative to another element. In the illustrated embodiment, the circuit board 410 may be attached directly to the lower housing member 210 by using an assembling member such as a screw and/or using an adhesive material. The first region 211 may indicate a portion of the planar bottom portion of the lower housing member 210, or may indicate a recess in the planar bottom portion in which the circuit board 410 is received.

When the circuit board 410 is attached directly to the lower housing member 210, the transformers 420 may be placed close to the lower housing 210 such that the transformers 420 correspond respectively to second regions 212 of the lower housing member 210. The second regions 212 of the lower housing member 210 are aligned with the transformers 420 of the circuit board 410. That is, the transformers 420 are fixed to the lower housing member 210 by the circuit board 410 disposed therebetween.

Figure 5:
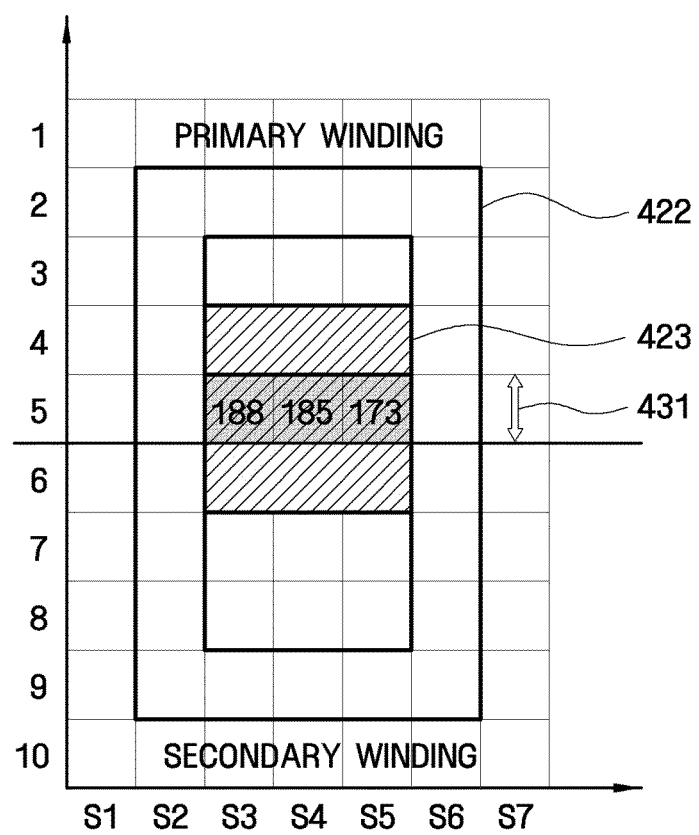
FIG. 5 is a two-dimensional (2D) graph illustrating an exemplary embodiment of a leakage flux in each region of a transformer.
Figure 6:
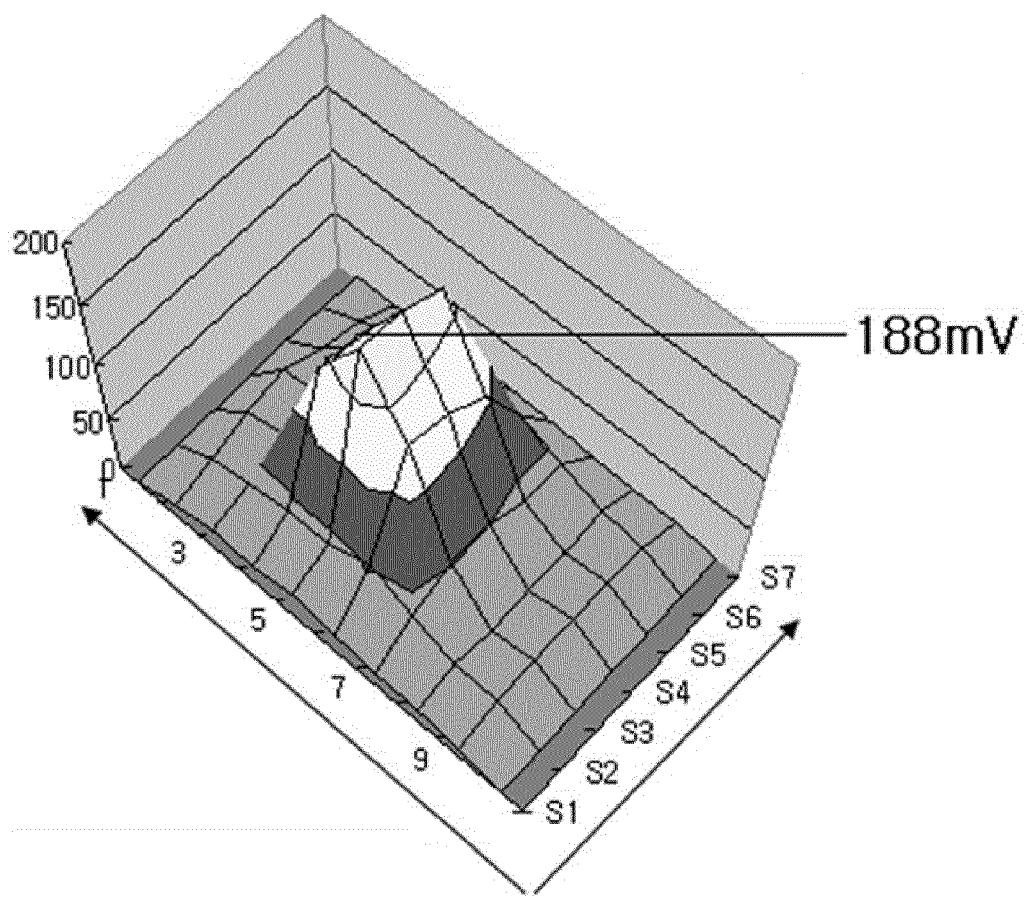
FIG. 6 is a three-dimensional (3D) graph illustrating the leakage flux in each region of a transformer.

FIG. 5 is a graph illustrating an exemplary embodiment of a leakage flux in each region of each of the transformers 420. FIG. 6 is a graph illustrating the leakage flux in each region of each of the transformers 420. That is, FIGS. 5 and 6 respectively are two-dimensional (2D) and three-dimensional (3D) representations of the leakage flux in each region of each of the transformers 420.

Referring to FIGS. 5 and 6, each of the transformers 420 may include a primary winding and a secondary winding which are separated from each other, and an insulating section between the primary and secondary windings. Operation characteristics of each of the transformers 420 are determined by a ratio of the number of turns in the secondary winding to the number of turns in the primary winding. The space between the primary winding and the secondary winding is the insulating section, and a length of the insulating section is represented by a first distance 431.

The leakage flux of a second region 422, e.g., an entire region of each of the transformers 420, and the leakage fluxes of regions around the second region 422 are illustrated in FIGS. 5 and 6.

Referring to FIG. 5, the leakage flux of the insulating section is shown in regions (S3, 5), (S4, 5) and (S5, 5). As illustrated in the drawing, the leakage fluxes of the regions (S3, 5), (S4, 5) and (S5, 5) may be 188, 185, and 173, respectively.

The leakage flux of the primary winding is shown in regions (S3, 3), (S4, 3), (S5, 3), (S3, 4), (S4, 4), and (S5, 4). In addition, the leakage flux of the secondary winding is shown in regions (S3, 6), (S4, 6), (S5, 6), (S3, 7), (S4, 7), (S5, 7), (S3, 8), (S4, 8), and (S5, 8).

On the whole, the leakage flux of a third region 423 is high. Specifically, the leakage fluxes of the regions (S3, 5), (S4, 5) and (S5, 5), that is, the leakage flux of the insulating section, are highest. Also, the leakage fluxes of the regions (S3, 4), (S4, 4), (S5, 4), (S3, 6), (S4, 6) and (S5, 6) around the regions (S3, 5), (S4, 5) and (S5, 5) are considerably high. The third region 423 overlaps both of adjacent ends of the primary and secondary windings of an individual transformer 420, and overlaps the insulating area disposed between the primary and secondary windings.

Figure 7:
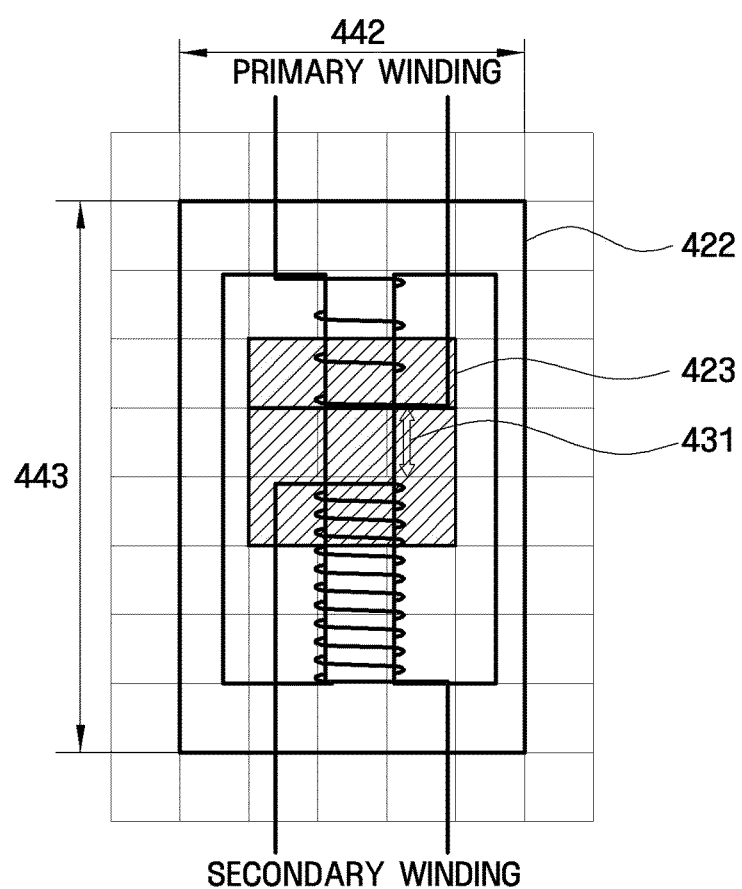
FIG. 7 is a diagram illustrating an exemplary embodiment of primary and secondary windings of a transformer, and a region of the transformer in which the leakage flux is concentrated.

FIG. 7 is a diagram illustrating an exemplary embodiment of the primary and secondary windings of each of the transformers 420, and a region of each of the transformers 420 in which the leakage flux is concentrated.

Referring to FIG. 7, horizontal and vertical lengths of the second region 422, which corresponds to the entire region of each of the transformers 420, have values of a second distance 442 and a third distance 443, respectively. As described above, a region of each of the transformers 420 in which the leakage flux is concentrated, is the third region 423 disposed between the primary and secondary windings. The third region 423 is located at both of opposing sides of the first distance 431 between the primary winding and the secondary winding. The winding form and the number of turns illustrated in FIG. 7 are a mere exemplary and are not limited to the illustrated embodiment.

Figure 8:
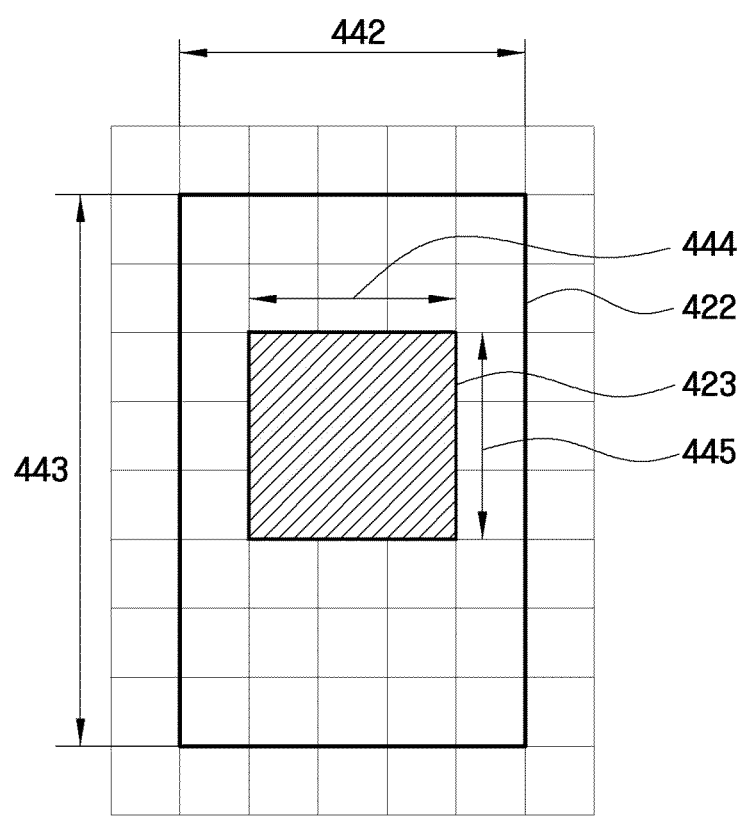
FIG. 8 is a diagram illustrating an exemplary embodiment of the region of a transformer in which the leakage flux is concentrated.

FIG. 8 is a diagram illustrating an exemplary embodiment of a region of each of the transformers 420 in which the leakage flux is concentrated.

Referring to FIG. 8, horizontal and vertical lengths of the third region 423 have values of a fourth distance 444 and a fifth distance 445, respectively, and an entire of the third region 423 is located within the second region 422. Therefore, the third region 423 is smaller than the second region 422. This means that the fourth distance 444 and the fifth distance 445 representing the third region 423, are smaller than the second distance 442 and the third distance 443 representing the of the second region 422, respectively.

Figure 9:
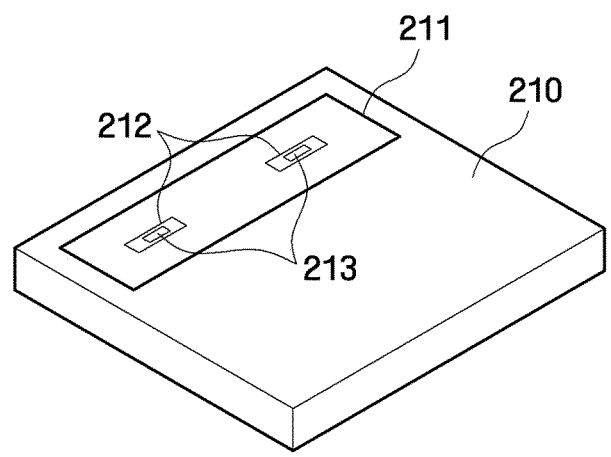
FIG. 9 is an exemplary embodiment of a rear view of the display apparatus, according to the invention.
Figure 10:
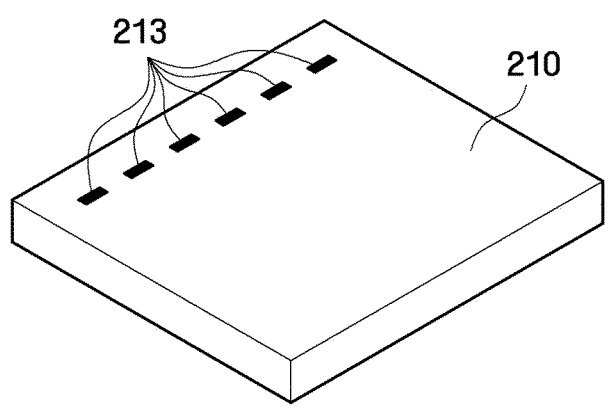
FIG. 10 is an exemplary embodiment of a rear view of the lower housing member, according to the invention.

FIG. 9 is an exemplary embodiment of a rear view of the display apparatus 10, according to the invention. FIG. 10 is an exemplary embodiment of a rear view of the lower housing member 210, according to the invention.

Referring to FIGS. 9 and 10, to attach the circuit board 410 having the transformers 420 mounted thereon to the lower housing member 210, one or more holes are disposed in each of third regions 213 of the lower housing member 210, which corresponds to the third region 423 of the transformers 420. Here, the number of holes may be equal to or less than the number of the transformers 420. One single continuous hole may be disposed in each of the third regions 213 corresponding to the third region 423, or more than one discrete hole may be disposed in each of the third regions 213.

The holes may have various shapes when viewed on a plane, such as polygons (e.g., a rectangle), circles, ovals, and partially curved surfaces. Each of the holes may be partially or completely extended through the planar bottom portion of the lower housing member 210. Partially extended holes may extend from a rear surface towards an inner area of the lower housing member 210, or may alternatively extend from the inner area towards the rear surface. In the plan view, the holes may be surrounded on all sides by the planar bottom portion of the lower housing member 210, such that each hole is an enclosed opening. The enclosed holes are solely defined by the planar bottom portion of the lower housing member 210. The enclosed holes may be an open member in the planar bottom portion of the lower housing 210, where no material of the bottom planar member of the lower housing 210 is disposed.

Each of the third regions 213 of the lower housing member 210 corresponds to (e.g., are aligned with) the third region 423 of the transformers 420 in which the leakage flux is concentrated, described above with reference to FIG. 3. That is, each of the third regions 213 of the lower housing member 210 includes a fourth region corresponding to the insulating section (e.g., the regions (S3, 5), (S4, 5) and (S5, 5)), and fifth regions corresponding respectively to the regions (S3, 4), (S4, 4), (S5, 4), (S3, 6), (S4, 6) and (S5, 6) directly adjacent to the insulating section. Here, the regions (S3, 4), (S4, 4) and (S5, 4) are some of the regions (S3, 3), (S4, 3), (S5, 3), (S3, 4), (S4, 4) and (S5, 4) corresponding to the primary winding, and the regions (S3, 6), (S4, 6) and (S5, 6) are some of the regions (S3, 6), (S4, 6), (S5, 6), (S3, 7), (S4, 7), (S5, 7), (S3, 8), (S4, 8) and (S5, 8) corresponding to the secondary winding.

One or more holes may be disposed in the third region 213 of the lower housing member 210 which aligns with to the insulating section (e.g., the regions (S3, 5), (S4, 5) and (S5, 5)). That is, one or more holes may be disposed in all or a portion of the region of the lower housing member 210 which corresponds to the insulating section of each of the transformers 420.

Although not shown in the drawings, a heat dissipation pad may be disposed in a portion of each of the second regions 212 of the lower housing member 210 in order to enhance heat dissipation effects.

Since one or more holes are disposed in the region of the lower housing member 210 which align or overlap with at least the insulating section of each of the transformers 420, the eddy current generated by the lower housing member 210 can be reduced. Accordingly, factors that degrade the quality of products, such as heat generation, increased power consumption and noise, can be reduced.

If no heat dissipation pad is used to suppress the generation of heat due to the leakage flux, an increase in material costs resulting from the use of heat dissipation pads can be reduced, thereby lowering the unit cost of the display apparatus 10.

Furthermore, since one or more holes are disposed only within a region of the lower housing member 210 aligned or overlapping with a region of each of the transformers 420 in which the leakage flux is concentrated 423, the introduction of foreign substances from an outside of the lower housing member 210, and through the lower housing member 210 (e.g., through the holes), can be minimized.

While the invention has been particularly shown and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display apparatus comprising:
   a display panel;
   a transformer disposed under the display panel and comprising:
      a primary winding and a secondary winding which are separated from each other; and
      an insulating section between the primary winding and the secondary winding; and
   a lower housing member on which the display panel is placed and to which the transformer is fixed,
   wherein
   a first region overlapping the insulating section of the transformer is defined in the lower housing member, and a hole is disposed in the first region of the lower housing member, and
   a second region aligned with an entire planar area of the transformer is defined in the lower housing member, and a planar area of the hole is larger than the first region and is smaller than the second region.

2. The display apparatus of claim 1, wherein a third region and a fourth region respectively overlapping the primary winding and the secondary winding of the transformer are defined in the lower housing member, and the hole is disposed overlapping a portion of the third region and a portion of the fourth region.

3. The display apparatus of claim 1, wherein a heat dissipation pad is attached to the lower housing member and disposed in a portion of the second region of the lower housing member.

4. The display apparatus of claim 1, further comprising a light source, wherein the transformer provides power to the light source.

5. The display apparatus of claim 4, wherein the light source is a cold cathode fluorescent lamp.

6. The display apparatus of claim 5, wherein a distance between the light source and the lower housing member is about 20 millimeters or less, the distance taken perpendicular to a plane of the lower housing member.

7. The display apparatus of claim 1, wherein the lower housing member includes a conductive material.

8. The display apparatus of claim 7, wherein an electrical potential of the lower housing member is a reference ground voltage of the display apparatus.

9. The display apparatus of claim 1, wherein the hole is polygonal in a plan view.

10. The display apparatus of claim 1, wherein the hole is shaped like a curved surface having a predetermined curvature in a plan view.

11. The display apparatus of claim 1, wherein the display panel is a liquid crystal display panel.

12. The display apparatus of claim 1, wherein the transformer further comprises a concentrated region where flux is concentrated, and the hole is only within a total area defined by the insulating region and the concentrated region.

13. The display apparatus of claim 1, wherein a plurality of the holes is disposed in the first region of the lower housing member.

14. The display apparatus of claim 1,
wherein the lower housing member comprises:
a planar bottom portion including a rear surface opposing the display panel, and
sidewalls extended from the planar bottom portion toward the display panel, and
wherein the transformer faces the rear surface of the planar bottom portion, and the hole is disposed in the planar bottom portion of the lower housing member.

15. The display apparatus of claim 14, further comprising a circuit board upon which the transformer is disposed, the circuit board disposed between the transformer and the planar bottom portion of the lower housing member.

16. A display apparatus comprising:
a display panel;
an upper housing member and a lower housing member receiving the display panel, the lower housing member including a bottom planar member and sidewalls extending from the bottom planar member; and
a transformer on a rear surface of the lower housing member, and comprising:
a primary winding and a secondary winding which are separated from each other; and
an insulating section between the primary winding and the secondary winding;
wherein
an open member is extended through the bottom planar member of the lower housing member, and
a planar area of the open member is larger than a planar area of the insulating section of the transformer and smaller than an entire planar area of the transformer.

17. A method of forming a display apparatus, the method including:
providing a display panel within an upper housing and a lower housing;
the lower housing comprising an open member extended completely through a bottom member of the lower housing; and
disposing a transformer on a rear surface of the bottom member of the lower housing opposite to the display panel,
the transformer comprising a primary winding, a secondary winding separated from the primary winding and an insulating section between the primary winding and the secondary winding; and
wherein
a planar area of the open member of the lower housing is larger than a planar area of the insulating section of the transformer and smaller than an entire area of the transformer.

* * * * *